May 20, 1969    G. E. BEYER    3,444,700
AIR CONDITIONER CONSOLE
Filed Aug. 30, 1967

INVENTOR.
Gerald E. Beyer
BY
John R. Faulkner
John J. Roethel
ATTORNEYS.

United States Patent Office 3,444,700
Patented May 20, 1969

3,444,700
AIR CONDITIONER CONSOLE
Gerald E. Beyer, Lathrup Village, Mich., assignor to Ford Motor Company, Dearborn, Mich., a corporation of Delaware
Filed Aug. 30, 1967, Ser. No. 665,670
Int. Cl. B60h 3/04
U.S. Cl. 62—244
5 Claims

ABSTRACT OF THE DISCLOSURE

Console air conditioning unit located between laterally spaced seats of a vehicle body.

Background of the invention

Most vehicle air conditioning units, whether they be installed as original equipment by the vehicle manufacturer or as an accessory item by an automobile dealer or other retailer of such units, present problems in locating the unit in the vehicle body. In factory installed units, the air distribution vents generally are placed in the fascia of the instrument panel. The duct work required to connect the vents to the cooling evaporator and blower encroaches on a large portion of the space between the instrument panel and the vehicle fire wall separating the passenger compartment from the engine compartment. It is a difficult job to route the duct work around the instrument clusters, the radio, the heating system duct work which in some cases is separate from the air conditioning duct work, the glove box and the various control cables, switches and wiring harnesses all of which must be located behind the instrument panel.

The so-called hang-on type of air conditioning units installed by after market retailers are suspended beneath the vehicle body instrument panel structure and substantially encroach on the leg room available in the front compartment of the vehicle body.

With both the built-in and hang-on type of units there usually is no way to route cool air to the rear seat passengers and they must rely solely on the air circulation currents within the vehicle compartment for any cooling effect.

A large number of vehicles currently being sold are of the type in which the front seats of the vehicle are separated by a console which usually functions as nothing more than an extra glove compartment or storage receptacle. It is an object of the present invention to utilize this console for housing some of the components of the vehicle air conditioning system.

Summary of the invention

The present invention is particularly adapted for use in vehicle bodies in which the passenger compartment has laterally spaced seats mounted on the compartment floor. A generally elongate console having a cavity therein is positioned between the seats. According to the present invention, an air conditioner evaporator is contained or positioned within the cavity. The console is provided with air inlet and outlet means, the air inlet means being in communication with one side of the evaporator and the air outlet means being in communication with the other side of the evaporator. Also housed within the console is blower means operable to cause air to flow from the air inlet means through the evaporator through the air outlet means for circulation in the passenger compartment.

Description of the drawing

Other objects, advantages and features of the present invention will be made more apparent as this description proceeds, reference being had to the accompanying drawings, wherein.

Description of the preferred embodiment

Figure 1:
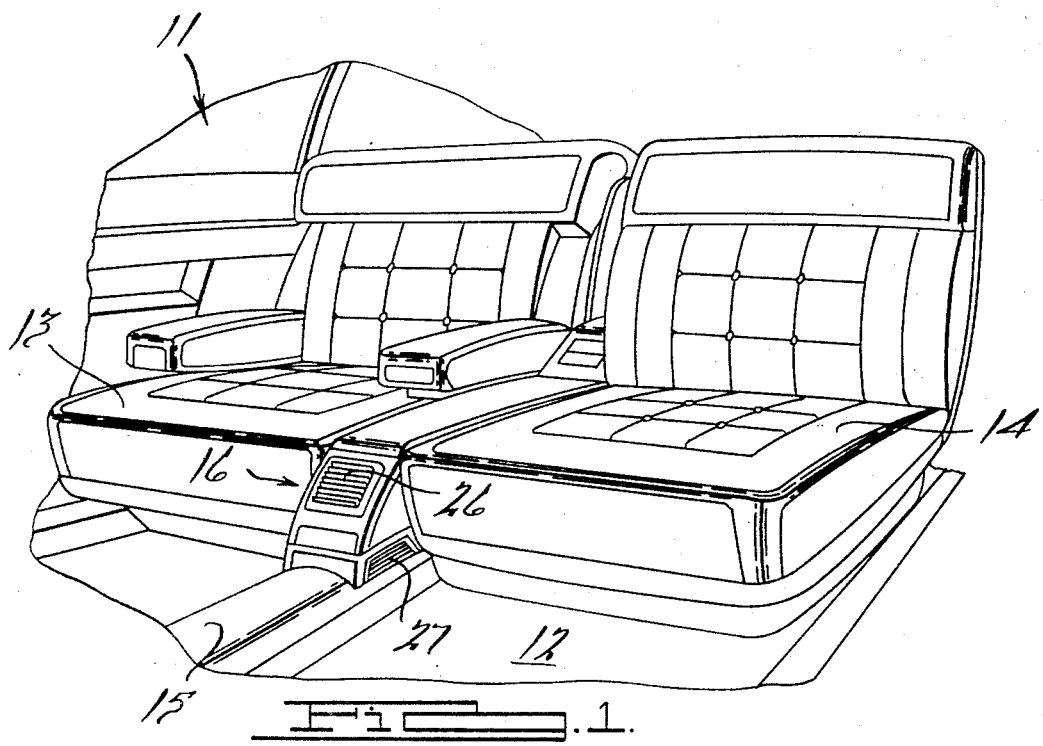
FIG. 1 is a partial interior view of a vehicle body illustrating a pair of laterally spaced vehicle seats with a console therebetween.

Referring now to the drawing, FIG. 1 illustrates the partial interior of a vehicle body 11 having a floor 12 on which is mounted a pair of laterally spaced seats 13 and 14. The space between the seats is partially occupied by a drive shaft tunnel 15 above which is mounted the console, generally designated 16, embodying the present invention.

Figure 2:
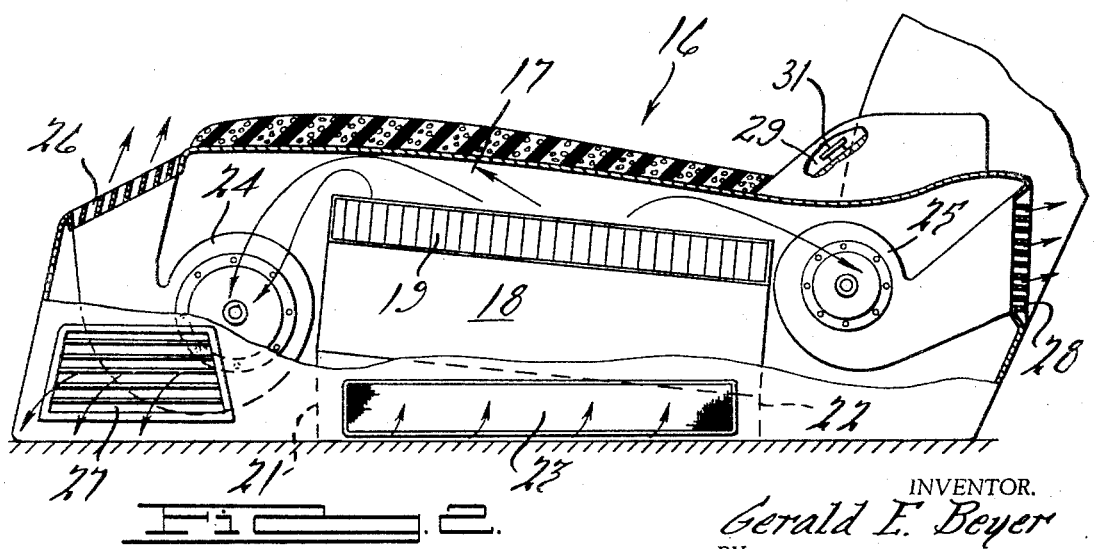
FIG. 2 is a view in part sectional of the console illustrating the components of the air conditioning system which are housed therewith.

The console 16 is a hollow sheet metal or plastic elongated box or housing having a cavity 17 in which some of the components of the vehicle air conditioning unit are contained. As best seen in FIG. 2, these components comprise an evaporating unit 18 carrying on its upper side a filter element 19. The lower side of the evaporator unit 18 is sealed off from the interior of the cavity 17 by support plates or baffles 21 and 22. The support plates or baffles 21 and 22 with the side walls of the console provide a chamber beneath the evaporator unit 18.

The evaporator unit 18 is connected to the air conditioner compressor and condenser by suitable conduits (not shown). This follows conventional practice in which the compresser and condenser are usually mounted in the engine compartment of the vehicle and the evaporator and blower components are remotely mounted from the the compressor and condenser. The evaporator, if not the blower, most frequently will be found on the passenger compartment side of the wall between the engine and passenger compartments.

Air to be cooled by passage through the evaporator 18 is drawn into the chamber below the evaporator through air inlet grills 23 located in the side walls of the console 16. The air inlet grills 23 are in communication with air spaces beneath the respective seats 13 and 14.

Air is drawn through the evaporator 18 by a pair of squirrel cage blower units 24 and 25. Blower unit 24 is located forwardly of the evaporator 18 and on its outlet side may be baffled to provide for discharge of cool air through a forwardly or upwardly facing grill or outlet vent 26 and through side grills or vents 27. The blower 25 rearwardly of the evaporator 18 is illustrated as discharging through a rearwardly facing grill or vent 28. The air outlets 26, 27 and 28 may be provided with shutters or deflectable vanes so that the air output direction and quantity may be selectively controlled.

As indicated at 29, the console may have a chamber for receiving the controls 31 for operating the air conditioning unit.

In operation, as indicated by the air flow arrows in FIG. 2, the air is drawn through the inlet grills 23 into the chamber beneath the evaporator 18 and then through the evaporator 18 into the intake openings in the blowers 24 and 25 from which blowers the air is then discharged through the air outlet grills 26, 27 and 28. Thus, the cool air distribution pattern can be arranged so that cool air is distributed along the front of the seats 13 and 14, upwardly in front of the front seat passengers of the vehicle, and rearwardly through the air outlet 28 to the rear seat passenger area.

It will be understood that this invention is not to be limited to the exact construction shown and described but that various changes and modifications may be made without departing from the spirit and scope of the invention as defined in the appended claims.

I claim:
1. In a vehicle body,
a passenger compartment having a floor and laterally spaced seats mounted on said floor,
a generally elongate console positioned between said seats,
said console having a cavity therein,
an air conditioner evaporator contained within said cavity,
air inlet means in said console in communication with one side of said evaporator,
air outlet means in said console in communication with the other side of said evaporator,
and blower means housed within said console to cause air flow from said air inlet through said evaporator to said air outlet means for circulation in said passenger compartment.
2. In a vehicle body according to claim 1, in which:
the air inlet means in said console are in the side walls of the console cavity and communicate with air spaces beneath the seats and with the underside of the evaporator.
3. In a vehicle body according to claim 2, in which:
the air outlet means in said console are located at the ends of the latter to direct air from the evaporator in front of and rearwardly of the seats.
4. In a vehicle body according to claim 3, in which:
the blower means comprises a pair of blowers, one of which is located fore and the other aft of the evaporator,
said blowers having inlet means in communication with the upper side of said evaporator and blower outlet means in communication with the air outlets at the respective ends of the console.
5. In a vehicle body according to claim 1, in which:
the air inlet means are located in the side portions of the console and the air outlet means are located in the front and rear portions of the console,
said air inlet means being in communication with air spaces beneath the seats to draw air therefrom and the air outlets being in communication with the passenger compartment areas forwardly and rearwardly of the seat to distribute cool air thereto.

References Cited
UNITED STATES PATENTS

| | | | |
|---|---|---|---|
| 2,311,953 | 2/1943 | McKechnie | 62—244 |
| 2,336,089 | 12/1943 | Gould | 62—244 |
| 2,430,335 | 11/1947 | Hart | 62—244 |
| 2,557,004 | 6/1951 | Lepper | 62—239 |
| 3,043,116 | 7/1962 | Fuller | 62—244 |
| 3,164,971 | 1/1965 | Gentz | 62—244 |

WILLIAM J. WYE, *Primary Examiner.*

U.S. Cl. X.R.

62—239; 165—41